Dec. 8, 1959   R. L. McILVAINE   2,916,267
INLET SHIELD FOR FILTER
Filed Oct. 12, 1956
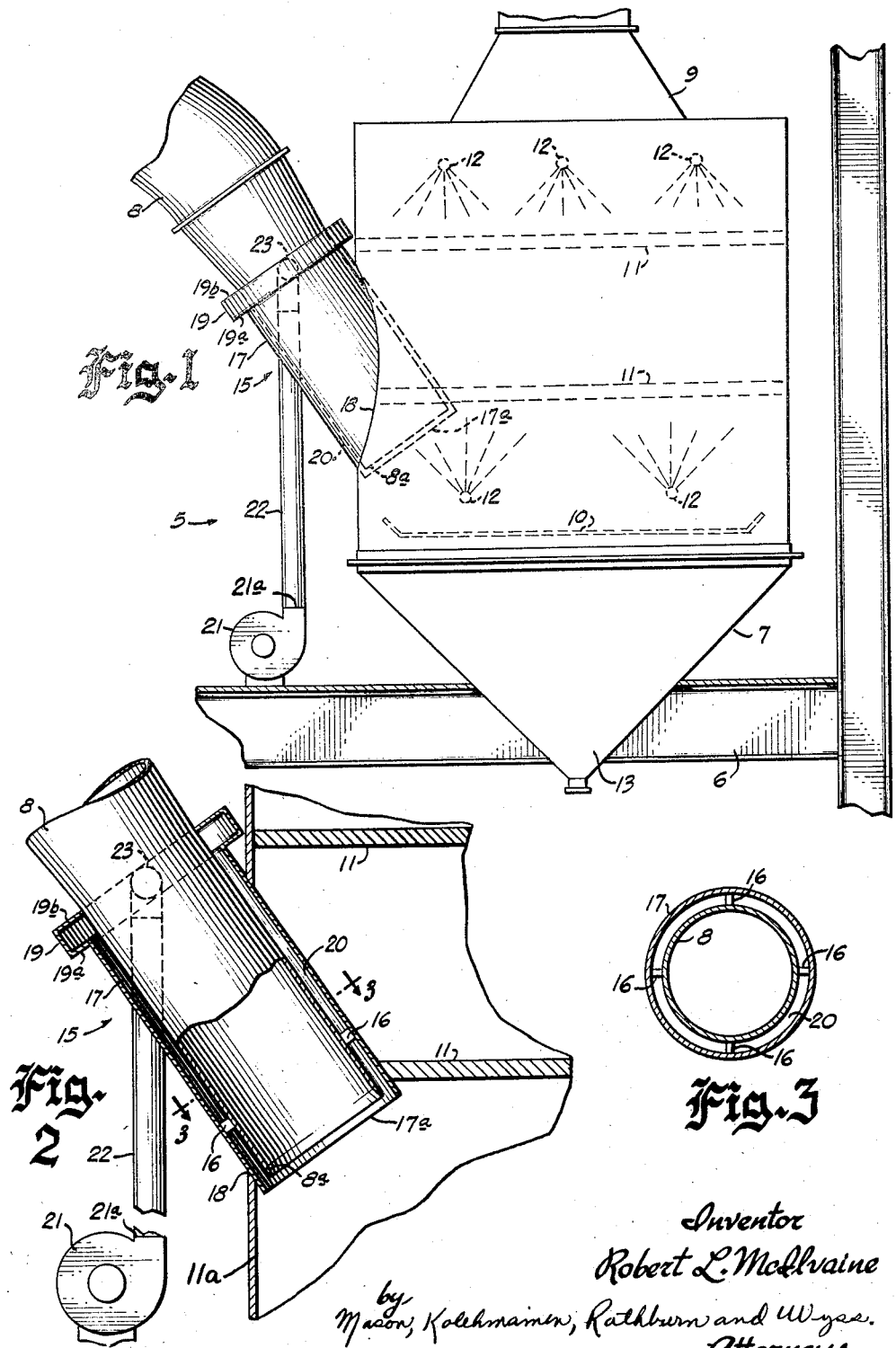
Inventor
Robert L. McIlvaine
by Mason, Kolehmainen, Rathburn and Wyss
Attorneys.

United States Patent Office 2,916,267
Patented Dec. 8, 1959

2,916,267

INLET SHIELD FOR FILTER

Robert L. McIlvaine, Winnetka, Ill., assignor to Herbert Simpson Corporation, Chicago, Ill., a corporation of Illinois Application October 12, 1956, Serial No. 615,581

4 Claims. (Cl. 261—16)

The present invention relates to a filter for removing hygroscopic materials suspended in a moving air stream and, more particularly, relates to an inlet shielding means for use with the filter.

In a number of the prior art filtering devices it is common to employ either a liquid or a liquid spray as the active filtering agent for removing undesirable contaminating elements from a fluid mass, e.g., hygroscopic particles suspended in an air stream. In order to insure maximum filtering action by the filtering agent, the contaminated air stream is preferably introduced at a point somewhere in the vicinity of the middle of the filter as, for example, by a conduit having an open end terminating near the center of the filter. The portion of the conduit extending into the filtering device is thus exposed to the liquid filtering agent which drains under the force of gravity down the conduit and flows over the open end thereof, with the result that the hygroscopic material in the contaminated air stream comes into contact with the liquid. The hygroscopic particles thus begin to build up and accumulate adjacent the open end of the conduit after which the liquid is drawn into the conduit by capillary action to cause additional hygroscopic build-up. The continued accumulation of hygroscopic particles eventually constricts the conduit and results in a reduction in flow of the air stream into the filtering device. Manual removal of the accumulated hygroscopic material is possible only by shutting down and disassembling the filter, a process which is both time-consuming and laborious, while removal by a cleansing agent such as clean water or the like introduced into the conduit is inadequate because of the difficulty in determining with certainty whether the build-up has been completely washed away.

It would, therefore, be desirable to provide an inlet shielding means for the portion of the inlet conduit disposed within a filtering device to prevent contact of the liquid filtering agent with the contaminated air stream and the attendant accumulation of hygroscopic material in the end of the conduit, and, accordingly, it is a primary object of the present invention to achieve the above-described result.

It is another object of the present invention to provide an inlet shield means for an inlet conduit terminating within a filter to insulate the contaminated stream issuing from the conduit from the filtering agent, thereby avoiding the build-up of hygroscopic material in the inside of the end of the inlet conduit.

It is another object of the present invention to provide an air stream filtering apparatus including structure for preventing any construction of the air stream inlet conduit caused by the build-up of hygroscopic material carried by the air stream.

Another object of the present invention resides in the provision of an insulating air shield for an air stream filtering apparatus which isolates the air stream emerging from the inlet conduit from the filtering agent.

The above and other objects are achieved in accordance with the present invention by providing a filtering apparatus for contaminated air containing hygroscopic particles. This apparatus has an inlet conduit for transporting the contaminated air to the filter where the air is treated with a liquid filtering agent to facilitate removal of the particles. The inlet conduit is provided with a novel inlet shielding means to prevent the filtering liquid from contacting the hygroscopic particles suspended in the contaminated air stream emerging from the end of the conduit. The shielding means includes a housing spaced from and disposed concentrically of the end of the conduit and a blower for supplying clean air in the space between the housing and the conduit, thus forming an air shield surrounding and protecting the contaminated air stream issuing from the conduit. The described arrangement assures that no contact is made between the hygroscopic particles suspended in the contaminated fluid and the liquid filtering agent flowing near the end of the inlet conduit, thus preventing accumulation of hygroscopic material within the conduit and, hence, avoiding constriction of the inlet conduit.

The invention both as to its organization and method of operation, together with further objects and advantages thereof, will best be understood by reference to the following specification taken in connection with the accompanying drawing, in which:

Fig. 1 is a side elevational view, illustrated partially in section, of a filtering apparatus embodying the principles of the present invention;

Fig. 2 is an enlarged view of a portion of Fig. 1, partially in section, illustrating the inlet shielding means; and Fig. 3 is a cross-sectional view taken along the lines 3—3 of Fig. 2.

Referring now to the drawing and particularly to Fig. 1 thereof, there is illustrated a filter of the type generally disclosed in McIlvaine Patent No. 2,691,423, issued October 12, 1954 on an application filed June 14, 1951 and assigned to the same assignee as the present application. Briefly, and as described in detail in the above-identified patent, the filter 5 is supported by a frame 6 and includes an enclosed casing 7 which is apertured to accommodate an inlet conduit 8 and an outlet conduit 9 adapted respectively to transport the contaminated gases to and the scrubbed gases out of the casing 7. The casing 7 centrally supports a deflector 10 for directing the contaminated gases upwardly toward a plurality of vertically spaced filter beds 11 on which are trained an active filtering water spray developed by the cooperative action of a plurality of spaced nozzle devices 12. A sump 13 is provided at the base of the casing 7 to collect and drain off the filtering agent.

As indicated above, in order to transport contaminated gases to the filter 5, the inlet conduit in the form of a cylindrical duct is employed and is partially disposed within the casing 7 such that the contaminated gases emerge from the conduit at approximately the center of the filter 5. Similarly, the outlet conduit 9 likewise in the form of a cylindrical duct is used to exhaust the scrubbed or cleansed gases from the filter 5 to the atmosphere. In one particular application of the present invention, the filter 5 has been used in cooperation with alumina kilns to filter out the highly hygroscopic alumina suspended in the exhaust air stream from the kilns.

In accordance with the present invention, an inlet shielding means 15 is positioned about that portion of the inlet conduit 8 disposed within the filter 5 for the purpose of preventing the contact of the liquid filtering agent and the hygroscopic particles at the end of the inlet conduit 8, thereby to avoid an accumulation of the hygroscopic material within the end of the conduit 8, More specifically, as shown in Fig. 2, the inlet shielding means 15 comprises a cylindrical housing 17 disposed concentrically about the inlet conduit 8, which housing has its lower brim 17a extended a short distance beyond the rim 8a of the inlet conduit. The diameter of the housing 17 is somewhat larger than that of the conduit 8 and, hence, a cylindrical air space 20 is formed between these two elements, as shown clearly in Fig. 3. One end portion of the housing 17 is positioned within an aperture 18 disposed in a wall 11a of the filter 5 and is fixedly secured to the filter by welding or the like. The end of the inlet conduit 8 is supported from the housing 17 by a plurality of spaced struts 16 of narrow width disposed longitudinally of the inlet conduit 8. The other end of the housing 17 is connected by welding or the like to an edge 19a of an annular collar 19 which has its outer edge 19b welded or otherwise secured to the outer surface of the conduit 8. In view of the foregoing description, it will be recognized that the water from the spray collects on the outside surface of the housing 17 and does not reach the surface of the conduit 8. The collected water drains downwardly along the housing 17 under the force of gravity into the sump 13 without engaging the hygroscopic particles at the rim 8a of the conduit 8.

In order positively to insulate the liquid draining down the housing 17 from the air stream emerging from the rim 8a of the inlet conduit, an insulating air shield is developed in the space 20. To this end, there is provided a blower 21 suitably supported on the frame 6 adjacent to the filter 5 and the housing 17. More particularly, the air stream is transported from the blower 21 to the collar 19 by an interconnecting duct 22 suitably attached at one end to the blower outlet 21a and at the other end to an apertured wall portion 23 of the collar 19, respectively. Thus, the air stream developed by the blower 21 flows through the duct 22, is distributed about the conduit 8 by the collar 19, and is moved down through the space 20 at a high velocity. This air stream issues from the space 20 as an insulating air shield of cylindrical shape surrounding the contaminated gases emerging from the conduit 8. The end portion of the conduit 8 is champered such that the thickness of the walls of the conduit 8 are reduced at the rim 8a to an annular knife-like edge, thereby eliminating any turbulence or eddy currents in the insulating air stream. This insulating air stream collects the contaminated liquid flowing down the outside of the housing 17 and directs it away from the end of the conduit 8. Thus, the insulating stream separates the contaminated air stream and the filtering liquid until they have been moved into the casing 7 sufficiently far to prevent a build-up of hygroscopic particles inside of the rim 8a of the inlet conduit.

In accordance with the above-described invention, it will be appreciated that whenever contaminated gases are passed through the conduit 8 into the filter 5 the blower 21 is energized. In view of the above description it will be recognized that the operation of the blower results in the formation of a continuous insulating air shield which cooperates with the extended construction of the housing 17 to prevent constriction of the conduit 8 by the accumulation of hygroscopic particles within the rim 8a of the conduit. Thus, the filter 5 may be operated continuously without the need of periodic removal of hygroscopic particles from the inlet conduit 8.

While the invention has been described in connection with a particular embodiment of the invention, it will be understood that various modifications may be made thereon which are within the true spirit and scope of the invention as defined in the appended claims.

What is claimed as new and desired to be secured by Letters Patent of the United States is:

1. In a filter for receiving hygroscopic material suspended in an air stream, apparatus for removing said particles from said stream including a casing and nozzle device for generating a filtering liquid spray in the casing, a conduit for transporting said air stream and including a portion extending into said casing, said portion including an end located within said casing, a housing conduit supported from said casing to be spaced from said transporting conduit, said housing surrounding said portion and extending beyond said end to prevent engagement of the liquid spray with said end portion, blower means for developing and pressurizing air, means in communication with said blower means and connected to an end of said housing for distributing the pressurized air in the space defined between said housing and conduit, the pressure of the air in said space being such that a continuous air shield is provided about the air stream containing said particles as it emerges from the end of said conduit.

2. In a filter for treating an air stream containing suspended hygroscopic particles, apparatus for removing said particles from said air stream including a casing and nozzle device for generating a filtering liquid spray in the casing, means including an end disposed within said casing for transporting said air stream, a housing supported from said casing and spaced from said transporting means to define a space therebetween, said housing surrounding and extending beyond said end to prevent engagement of said liquid spray with said end, and means for pressurizing and moving air through said space to produce an air shield immediately about said air stream containing said particles as said air stream emerges from said end, the pressure of the air in said air shield being sufficient to provide an air shield extending beyond the end of the transporting means and the housing, thereby insulating said air stream from said fluid spray and preventing an accumulation of said hygroscopic particles about said end.

3. In a filter for treating an air fluid containing hygroscopic particles, an apparatus for filtering said hygroscopic particles out of said fluid and including liquid spraying means for developing a liquid spray in the apparatus, means for conducting said fluid through a part of the apparatus and having an end positioned within said apparatus and exposed to the liquid spray, means for pressurizing air, and means for providing an air fluid shield flowing under pressure, said fluid shield passing beyond the end of said conducting means and extending in the same direction as said fluid, thereby to encircle said fluid in and beyond the region of said end to prevent contact of the liquid spray with said fluid conducted adjacent said end.

4. In a filter for removing hygroscopic material suspended in an air stream, means for delivering said air stream into said filter, means for developing within said filter a water spray for removing said material from said air stream, said delivering means including a conduit having an end disposed within said filter, and means for pressurizing fluid and passing it as a fluid shield around and immediately adjacent to said end of said delivering means in order to protect said end from said fluid spray, thereby to prevent the build-up of hygroscopic material at the said end of said conduit.

References Cited in the file of this patent

UNITED STATES PATENTS

| | | |
|---|---|---|
| 1,110,868 | Bauer | Sept. 15, 1914 |
| 1,212,199 | Eustis | Jan. 16, 1917 |
| 1,611,548 | Miller | Dec. 21, 1926 |
| 2,478,557 | Bell et al. | Aug. 9, 1949 |
| 2,523,441 | McKamy | Sept. 26, 1950 |
| 2,691,423 | McIlvaine | Oct. 12, 1954 |
| 2,712,961 | Richardson | July 12, 1955 |
| 2,763,337 | Schneible | Sept. 18, 1956 |

FOREIGN PATENTS

| | | |
|---|---|---|
| 425,059 | France | Mar. 28, 1911 |